(12) United States Patent
Fitzgerald

(10) Patent No.: US 11,172,015 B1
(45) Date of Patent: Nov. 9, 2021

(54) METHODS AND SYSTEMS FOR EVERGREEN LINK GENERATION AND PROCESSING

(71) Applicant: Okanjo Partners, Inc., Milwaukee, WI (US)

(72) Inventor: Kevin Fitzgerald, Franklin, WI (US)

(73) Assignee: Okanjo Partners, Inc., Milwaukee, WI (US)

( * ) Notice: Subject to any disclaimer, the term of this patent is extended or adjusted under 35 U.S.C. 154(b) by 0 days.

(21) Appl. No.: 17/038,794

(22) Filed: Sep. 30, 2020

Related U.S. Application Data

(60) Provisional application No. 63/024,792, filed on May 14, 2020.

(51) Int. Cl.
| | |
|---|---|
| *G06F 15/173* | (2006.01) |
| *G06F 15/16* | (2006.01) |
| *H04L 29/08* | (2006.01) |
| *H04L 29/06* | (2006.01) |

(52) U.S. Cl.
CPC .......... *H04L 67/02* (2013.01); *H04L 67/2804* (2013.01); *H04L 67/2852* (2013.01); *H04L 67/32* (2013.01); *H04L 67/42* (2013.01)

(58) Field of Classification Search
CPC combination set(s) only.
See application file for complete search history.

(56) References Cited

U.S. PATENT DOCUMENTS

| | | | |
|---|---|---|---|
| 10,177,967 B2 | 1/2019 | Lakes et al. | |
| 2003/0191816 A1* | 10/2003 | Landress | G06Q 30/02 709/219 |
| 2006/0282327 A1* | 12/2006 | Neal | H04N 21/222 705/14.53 |
| 2013/0275580 A1* | 10/2013 | Chamiel | G06Q 30/0242 709/224 |
| 2014/0280919 A1* | 9/2014 | Lakes | H04L 67/2814 709/224 |

(Continued)

OTHER PUBLICATIONS

International Search Report and Written Opinion for Application No. PCT/US2020/053483 dated Dec. 31, 2020 (16 pages).

(Continued)

*Primary Examiner* — Jude Jean Gilles
(74) *Attorney, Agent, or Firm* — Michael Best & Friedrich LLP

(57) ABSTRACT

Methods and systems for evergreen link generation and processing. One system includes an electronic processor configured to receive, from a publisher device, a first request for an evergreen link associated with a first target. The electronic processor is also configured to generate the evergreen link for the first target and enable access to the evergreen link by the publisher device. The electronic processor is also configured to receive, from a client device, a second request in response to a selection of the evergreen link. The electronic processor is also configured to determine whether the first target is valid. The electronic processor is also configured to, when the first target is not valid, determine a replacement target and provide, to the client device, the replacement target. The electronic processor is also configured to, when the first target is valid, provide, to the client device, the first target.

20 Claims, 5 Drawing Sheets

(56) References Cited

U.S. PATENT DOCUMENTS

| | | | | |
|---|---|---|---|---|
| 2014/0379496 A1* | 12/2014 | Smith | .................... | H04L 67/10 |
| | | | | 705/14.73 |
| 2015/0088980 A1* | 3/2015 | Lakes | .................... | H04L 67/02 |
| | | | | 709/203 |
| 2019/0280916 A1 | 9/2019 | Lakes et al. | | |

OTHER PUBLICATIONS

Kier, "Evergreen Links for Authors—Part 1: What Are They and How Will They Save You Time", Writers Fun Zone, <https://writersfunzone.com/blog/2018/08/21/evergreen-links-for-authors-part-1-what-are-they-and-how-will-they-save-you-time-by-vanessa-kier/>. Aug. 2018, 14 pages.

Kier, "Evergreen Links for Authors—Part 2 Three Free Tools for Creating Evergreen Links", Writers Fun Zone, <https://writersfunzone.com/blog/2018/09/18/evergreen-links-for-authors-part-2-three-free-tools-for-creating-evergreen-links-by-vanessa-kier/>, Sep. 2018, 15 pages.

\* cited by examiner

METHODS AND SYSTEMS FOR EVERGREEN LINK GENERATION AND PROCESSING

RELATED APPLICATIONS

This application claims priority to U.S. Provisional Patent Application No. 63/024,792, filed May 14, 2020, the entire contents of which are incorporated herein by reference.

FIELD

Embodiments relate to evergreen link generation and processing.

BACKGROUND

Website servers host one or more websites that provide information and offerings to client devices (for example, smart phones, laptop computers, tablets, desktop computers, or other computing devices). Generally, a client device executes a web browser or other dedicated software application that accesses and communicates with the website server over one or more wired and wireless communication networks (for example, the Internet, a local area network, a wide area network, a cellular network, or the like) to provide input to the website server, make requests for data to the website server, obtain data from the website server, and the like. For example, the web browser may obtain webpages and related data that make up a website and display the website on the client device (via a display device of the client device). Some webpages include links that direct the web browser to another target. A target may include, for example, another website, server, software application, file, webpage, or the like. When the web browser receives or detects a user selection of a link on a webpage, the web browser may be directed to the target associated with the selected link. As one example, the web browser may be directed to download a file (as the target). As another example, the web browser may be directed to visit (or display) a website (as the target).

Some websites (affiliate websites) include a link to a product, good, or service offered for sale by another website (a vendor website). A vendor operating the vendor website will, in some cases, offer a commission to an affiliate operating the affiliate website for sales of products stemming from referrals (or consumers) that followed the link on the affiliate website. Intermediary systems have been developed that assist in generating links for affiliates to include on affiliate websites and for vendors to track referral purchases for the purpose of, for example, providing commissions.

SUMMARY

However, over time, a target or target offering associated with a link on an affiliate website may cease to exist or may change such that the original target is no longer available. As one example, where the target is a product, the vendor may cease to offer the product or the product may be out of stock. When a target is no longer available, the link associated with that target becomes "broken." Broken links lead to website errors, inefficiencies and frustrations for clients, vendors, and affiliates, lost revenue by vendors and affiliates, and the like. Additionally, because multiple parties may be involved in a link on an affiliate website (e.g., client, vendor, affiliate, and intermediary systems), simple replacement by a client device of broken link with a new link to another offering is not sufficient to ensure that the relevant parties may be identified and tracked as desired in the system.

To solve these and other problems, the embodiments described herein provide, among other things, systems and methods for generating evergreen links and processing evergreen link requests on an intermediary system to avoid broken links by providing relevant replacement data. In some embodiments, the intermediary system includes an intermediary platform server that receives a request, from a publisher device, for an evergreen link for a first target. The server, in response, generates an evergreen link for the first target and provides the evergreen link to the publisher device. Then, the server receives a request from a client device in response to selection of the evergreen link, wherein the evergreen link was received by the client device from the publisher device. The server determines whether the first target is valid. In response to the server determining that the first target is no longer valid, the server determines a replacement target. The server then provides the replacement target to the client device in reply to the request. In response to the server determining that the first target is valid, the server provides the first target to the client device in reply to the request. Accordingly, the systems and methods result in fewer broken links and their associated website errors, inefficiencies, and lost revenue.

For example, one embodiment provides a system for evergreen link generation and processing. The system includes an electronic processor configured to receive, from a publisher device, a first request for an evergreen link associated with a first target. The electronic processor is also configured to generate the evergreen link for the first target and enable access to the evergreen link by the publisher device. The electronic processor is also configured to receive, from a client device, a second request in response to a selection of the evergreen link, wherein the evergreen link was received by the client device from the publisher device. The electronic processor is also configured to determine whether the first target is valid. The electronic processor is also configured to, when the first target is not valid, determine a replacement target and provide, to the client device, the replacement target in reply to the second request. The electronic processor is also configured to, when the first target is valid, provide, to the client device, the first target in reply to the second request.

Another embodiment provides a method for evergreen link generation and processing. The method includes receiving, from a publisher device with an electronic processor, a first request for an evergreen link associated with a first target. The method also includes generating, with the electronic processor, the evergreen link for the first target. The method also includes enabling, with the electronic processor, access to the evergreen link by the publisher device. The method also includes receiving, from a client device with the electronic processor, a second request in response to a selection of the evergreen link, wherein the evergreen link was received by the client device from the publisher device. The method also includes determining, with the electronic processor, whether the first target is valid. The method also includes, when the first target is not valid, determining, with the electronic processor, a replacement target, and providing, to the client device with the electronic processor, the replacement target in reply to the second request. The method also includes, when the first target is valid, providing, to the client device with the electronic processor, the first target in reply to the second request.

Yet another embodiment provides a non-transitory, computer-readable medium storing instructions that, when executed by an electronic processor, perform a set of functions. The set of functions includes receiving, from a publisher device, a first request for an evergreen link associated with a first target. The set of functions also includes generating the evergreen link for the first target. The set of functions also includes enabling access to the evergreen link by the publisher device. The set of functions also includes receiving, from a client device, a second request in response to a selection of the evergreen link, wherein the evergreen link was received by the client device from the publisher device. The set of functions also includes determining whether the first target is valid. The set of functions also includes, when the first target is not valid, determining a replacement target, and providing, to the client device, the replacement target in reply to the second request. The set of functions also includes when the first target is valid, providing, to the client device, the first target in reply to the second request.

Other aspects and embodiments will become apparent by consideration of the detailed description and accompanying drawings.

DETAILED DESCRIPTION

Before any embodiments are explained in detail, it is to be understood that the embodiments are not limited in their application to the details of construction and the arrangement of components set forth in the following description or illustrated in the following drawings. Other embodiments are possible and embodiments described and/or illustrated here are capable of being practiced or of being carried out in various ways.

It should also be noted that a plurality of hardware and software-based devices, as well as a plurality of different structural components may be used to implement the embodiments described herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the disclosed embodiments may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
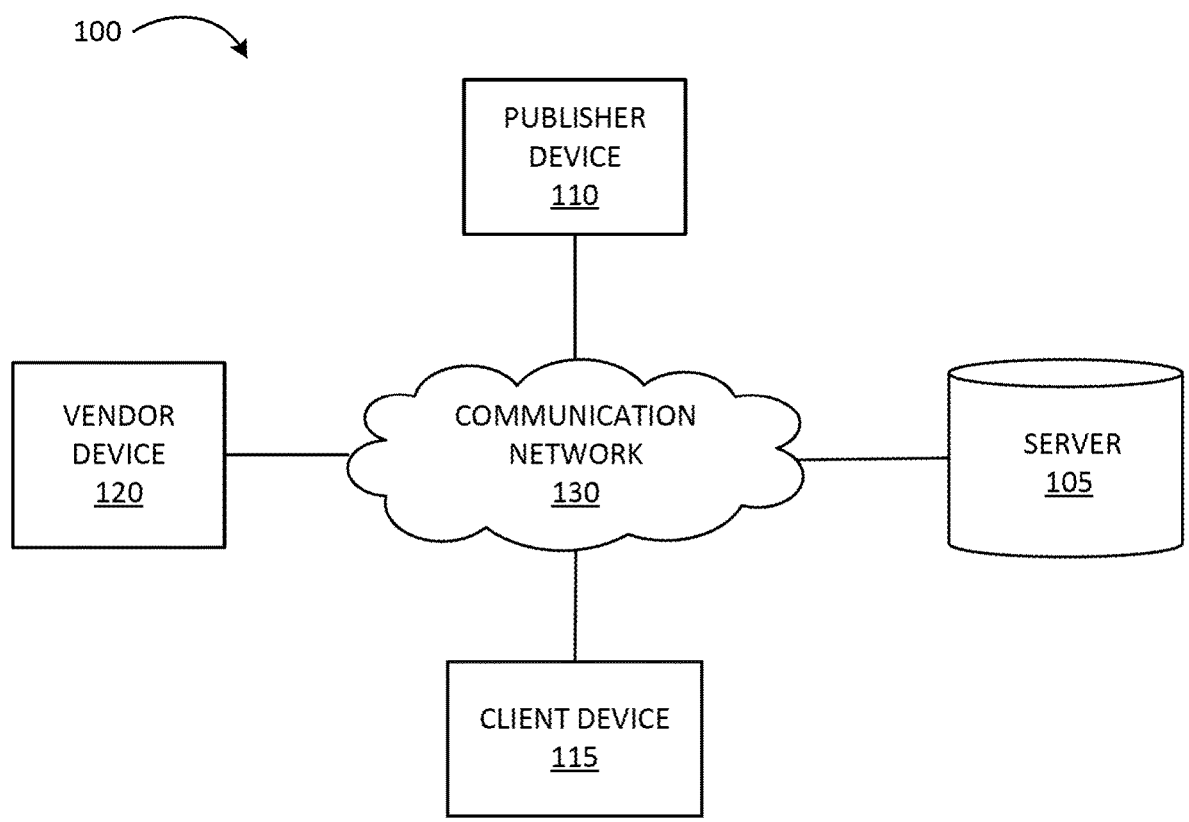
FIG. 1 schematically illustrates a system for evergreen link generation and processing according to some embodiments.

FIG. 1 illustrates a system 100 for evergreen link generation and processing according to some embodiments. In the illustrated example, the system 100 includes a server 105, a publisher device 110, a client device 115, and a vendor device 120. In some embodiments, the system 100 includes fewer, additional, or different components than illustrated in FIG. 1 in various configurations. For example, the system 100 may include multiple servers 105, publisher devices 110, client devices 115, vendor devices 120, or a combination thereof. Additionally, in some embodiments, one or more components of the system 100 may be distributed among multiple devices, servers, or databases, combined into a single device, server, or database, or a combination thereof.

The server 105, the publisher device 110, the client device 115, and the vendor device 120 communicate over one or more wired or wireless communication networks 130. Portions of the communication networks 130 may be implemented using a wide area network, such as the Internet, a local area network, such as a Bluetooth™ network or Wi-Fi, and combinations or derivatives thereof. Alternatively or in addition, in some embodiments, components of the system 100 communicate directly as compared to through the communication network 130. Also, in some embodiments, the components of the system 100 communicate through one or more intermediary devices not illustrated in FIG. 1.

Figure 2:
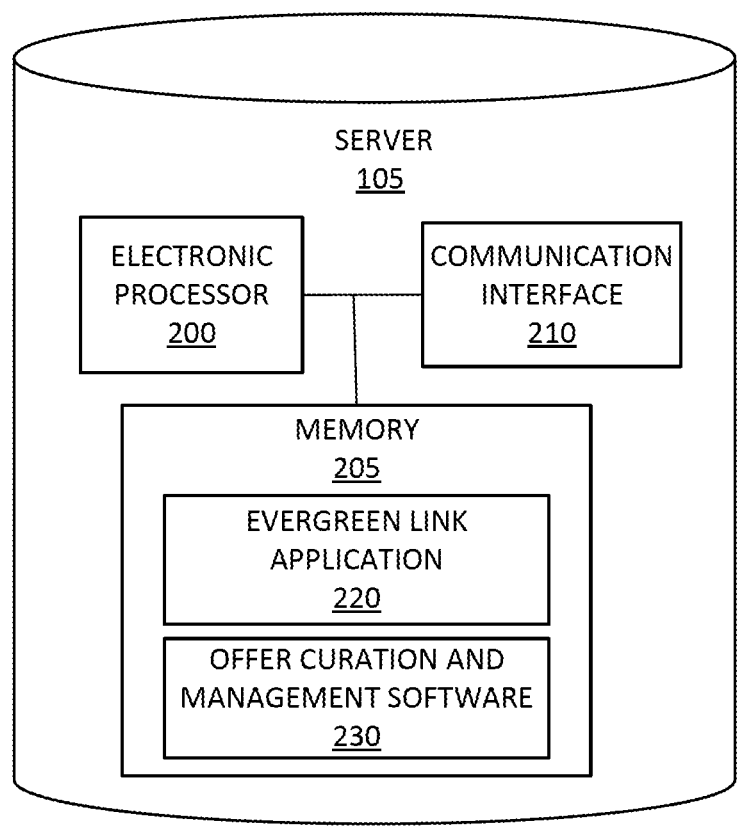
FIG. 2 schematically illustrates a server included in the system of FIG. 1 according to some embodiments.

The server 105 includes a computing device, such as a server, a database, or the like. As illustrated in FIG. 2, the server 105 includes an electronic processor 200, a memory 205, and a communication interface 210. The electronic processor 200, the memory 205, and the communication interface 210 communicate wirelessly, over one or more communication lines or buses, or a combination thereof. The server 105 may include additional components than those illustrated in FIG. 2 in various configurations. For example, the server 110 may also include one or more human machine interfaces, such as a keyboard, keypad, mouse, joystick, touchscreen, display device, printer, speaker, and the like, that receive input from a user, provide output to a user, or a combination thereof.

The communication interface 210 may include a transceiver that communicates with one or more components of the system 100 over the communication network 130 and, optionally, one or more other communication networks or connections. The electronic processor 200 includes a microprocessor, an application-specific integrated circuit ("ASIC"), or another suitable electronic device for processing data, and the memory 205 includes a non-transitory, computer-readable storage medium. The electronic processor 200 is configured to retrieve instructions and data from the memory 205 and execute the instructions. As illustrated in FIG. 2, the memory 205 includes an evergreen link application 220. The evergreen link application 220 is a software application executable by the electronic processor 200. As described in more detail below, the electronic processor 200 executes the evergreen link application 220 to generate evergreen links and process evergreen link requests.

As seen in FIG. 2, the memory 205 may also store offer curation and management software 230. In some embodiments, the offer curation and management software 230 is a software application executable by the electronic processor 200. The electronic processor 200 executes the offer curation and management software 230 to manage and provide offer data. Offer data may include a target (or target offering) and related target data. As noted above, a target may include a product, good, or service offered for sale on, for example, a vendor website. Related target data may include, for example, a product category, a commission yield for an affiliate (for example, a percentage of sale, a flat rate, a cost per click or impression, and the like), a date (for example, a created data, an updated date, or the like), a description of the target (for example, target details, target features, and the like), an identifier (for example, a SKU, a UPC, an ISBN, an EAN, a GTIN, and the like), an image, a manufacturer, a maturity level (for example, adults, general audiences, children, or the like), a merchant or advertiser brand, a popularity (for example, reviewer ratings, number of purchases, and the like), a price (for example, a list price, a sale price, a subscription cost, a shipping cost, and the like), a title, a URL, a variation (for example, a size, a color, or the like), a vendor (for example, an affiliate network, an origin of the target, or the like), another parameter associated with the parameter, or a combination thereof.

Figure 3:
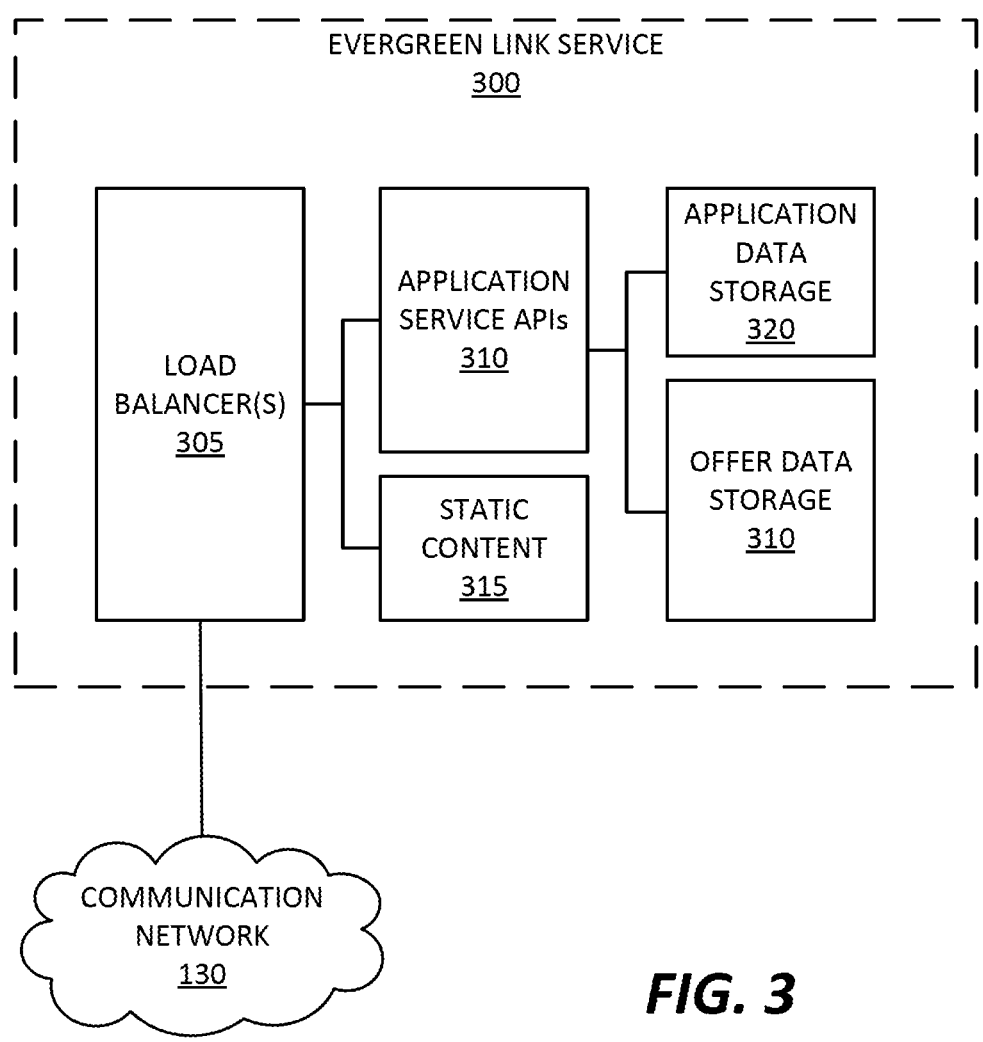
FIG. 3. schematically illustrates an evergreen link service according to some embodiments.

The server 105 may also perform additional functionality other than the functionality described herein. Also, the functionality described herein as being performed by the server 105 may be distributed among multiple servers or devices (for example, as part of a cloud service or cloud-computing environment). As one example, FIG. 3 illustrates an evergreen link service 300 according to some embodiments. The evergreen link service 300 may be broken up into independent services that work together to make up the services or functionality of, for example, the server 105. As seen in FIG. 3, the evergreen link service 300 may include one or more load balancers 305, an application service API 310, static content 315, application data storage 320, and offer data storage 320. Each component of the evergreen link service 300 may be provided by one or more servers, databases, or devices. As one example, the offer data storage 320 may include a plurality of databases (as a database system) for storing offer data. As another example, the application data storage 320 may store the evergreen link application 220, the offer curation and management software 230, or a combination thereof. Although not illustrated, the evergreen link service 300 may implement one or more development environments, sandbox environments, or a combination thereof. As seen in FIG. 3, in some embodiments, the one or more load balancers 305 are exposed directly to the Internet (for example, the communication network 130) while the remaining components are isolated on an internal network, such as a local area network.

The publisher device 110, the client device 115, the vendor device 120, or a combination thereof may be computing devices, such as a desktop computer, a laptop computer, a tablet computer, a terminal, a smart telephone, a smart television, a smart wearable, or another suitable computing device that interfaces with a user. Although not illustrated in FIG. 1, the publisher device 110, the client device 115, the vendor device 120, or a combination thereof may include similar components as the server 105, such as an electronic processor (for example, a microprocessor, an ASIC, or another suitable electronic device), a memory (for example, a non-transitory, computer-readable storage medium), a communication interface, such as a transceiver, for communicating over the communication network 130 and, optionally, one or more additional communication networks or connections, and one or more human machine interfaces. For example, to communicate with other components of the system 100, the publisher device 110, the client device 115, the vendor device 120, or a combination thereof may store a browser application or a dedicated software application executable by an electronic processor. The system 100 is described herein as providing an evergreen link generation and processing service through the server 105. However, in other embodiments, the functionality described herein as being performed by the server 105 (or a portion thereof) may be locally performed by the publisher device 110, the client device 115, the vendor device 120, or a combination thereof. For example, in some embodiments, the publisher device 110, the client device 115, the vendor device 120, or a combination thereof may store the evergreen link application 220, the offer curation and management software 230, or a combination thereof.

The vendor device 120 may be used by a vendor (or merchant) for managing and hosting a vendor web site. A vendor web site may include, for example, a list of products, goods, or services offered by the vendor, additional information associated with the offered products, goods, or services, or the like. As one example, a vendor may be a kayak vendor. According to this example, the kayak vendor may interact with the vendor device 120 to manage and host a website selling kayaks, kayaking accessories, and other kayak related merchandise or equipment. In some embodiments, the functionality described as being performed by the vendor device 120 may be distributed among multiple devices, servers, or databases. As one example, the vendor device 120 may be part of a vendor network including additional components (for example, additional computing devices, servers, or databases) for managing and hosting the vendor website and related data.

The publisher device 110 may be used by a publisher or affiliate for generating and publishing content related to or associated with a product, good, or service. Content may include, for example, an article, an electronic communication (for example, a marketing e-mail), a blog posting, a webpage, a digital video or post, a podcast or other audio media, print media, or the like. In some embodiments, the content includes one or more links (for example, a hyperlink or a uniform resource identifier ("URI")) for a product, good, or service (for example, a product, good, or service offered for sale on a vendor website). In some embodiments, the one or more links are evergreen links generated and processed by the server 105 (for example, the evergreen link application 22). As one example, an affiliate may use the publisher device 110 to generate an article listing the top ten kayaks (as the content). The article may be published or hosted on the affiliate's website. The article may include a link for each kayak included in the article. In some embodiments, the functionality described as being performed by the publisher device 110 may be distributed among multiple devices, servers, or databases (such as part of a cloud service). As one example, the publisher device 110 may be part of a publisher network including additional components (for example, additional computing devices, servers, or databases) for managing and hosting the affiliate network.

The client device 115 may be used by an end user or consumer (for example, a referral) for accessing and browsing vendor websites, affiliate websites, dedicated software applications of the vendor, and the like (for example, via a web browser of the client device 115). Following the above example, a consumer may use the client device 115 to access and interact with the affiliate website, and, more specifically, the article listing the top ten kayaks. The consumer may interact with the article by selecting a link for a kayak included in the article that is offered for sale on the kayak vendor's website. In response to selecting the link, as an example, the client device 115 may be directed to the kayak vendor's website. The consumer, via the web browser of the client device 115, may ultimately purchase the kayak using the kayak vendor's website. The vendor device 120 may also determine from which publisher device 120 or website the client device 115 came based on information provided in the link (e.g., a unique identifier of the publisher device 120 or website). The vendor device 120, in turn, may save this information and information about purchases that result from the visit at the kayak vendor's website (for example, a number of purchase, cost of the purchase, item purchased, and the like), and ultimately provide compensation to the publisher when the consumer purchases an offering provided by the kayak vendor. In some embodiments, the link directs the client device 115 to a section or item within a dedicated software application (an "app") executing on the client device 115, rather than to a website via a web browser. Additionally, as explained below in further detail, in some instances, additional or different actions are taken in response to selection of the evergreen link, particularly, when an original target offering of the evergreen link is no longer available.

Figure 4:
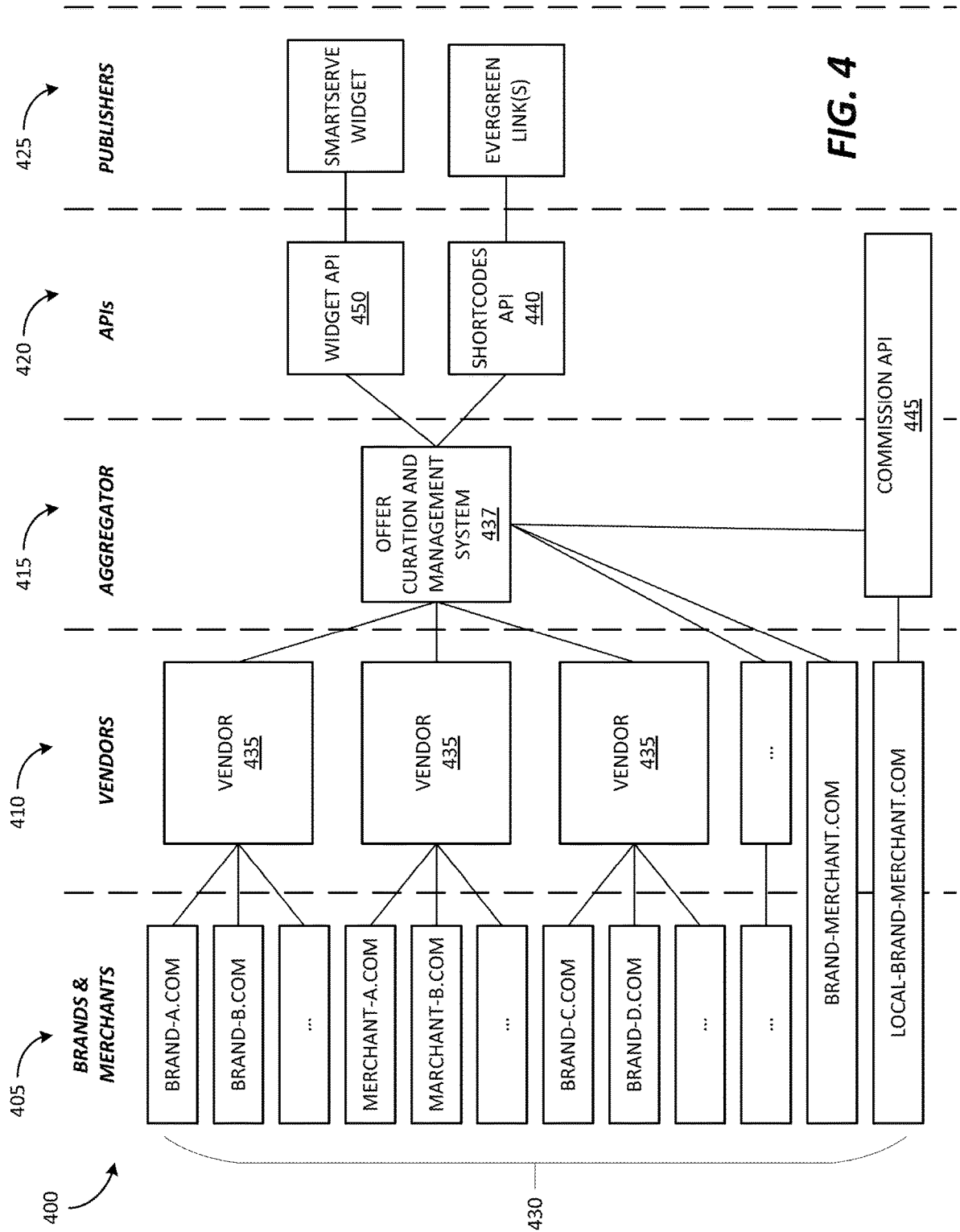
FIG. 4 schematically illustrates a flow diagram for the system of FIG. 1 according to some embodiments.

FIG. 4 schematically illustrates an example flow diagram 400 for the system 100 according to some embodiments. As seen in FIG. 4, the flow diagram 400 includes a brand and merchant portion 405, a vendor portion 410, an aggregator portion 415, an application programming interface ("API") portion 420, and a publisher portion 425. The brand and merchant portion 405 includes one or more brands or merchants 430 providing or manufacturing products or services. The vendor portion 410 includes one or more vendors 435 that offer products, goods, or services for sale to end users or consumers. A vendor 435 may include, for example, an e-commerce marketplace platform, such as Amazon.com, Rakuten.com, ShareASale.com, or the like. As one example, a Brand-A may manufacture Brand-A shoes, where a Vendor-A offers Brand-A shoes for sale to consumers via Vendor-A's website. As seen in FIG. 4, in some embodiments, an entity may be both a brand or merchant 430 and a vendor 435. As one example, Amazon may offer Amazon-branded products for sale on Amazon. com. The entities included in the brand and merchant portion 405, the vendor portion 410, or a combination thereof may use one or more vendor devices or networks (for example, the vendor device 120) for managing and hosting vendor websites. The aggregator portion 415 aggregates product offers from the brands and merchants 430 and the vendors 435 as offer data. In some embodiments, the offer data may be stored and managed by an offer curation and management system 437 (for example, the offer curation and management software 230). The API portion 420 includes one or more APIs implemented by the server 105 as part of generating and processing evergreen links. For example, the API portion 420 may include a shortcodes API 440, a commission API 445, and a widget API 450. In some embodiments, the components of the API portion 420 may be included within the application service APIs 310 of the evergreen link service 300 of FIG. 3. Accordingly, in some embodiments, the aggregator portion 415 and the API portion 420 relates to functionality performed by the server 105 (or the evergreen link service 300 of FIG. 3). The publisher portion 425 relates to functionality provided to or made accessible to an affiliate via the publisher device 110, such as a SmartServe Widget, one or more evergreen links, or the like, as described in greater detail below.

Figure 5:
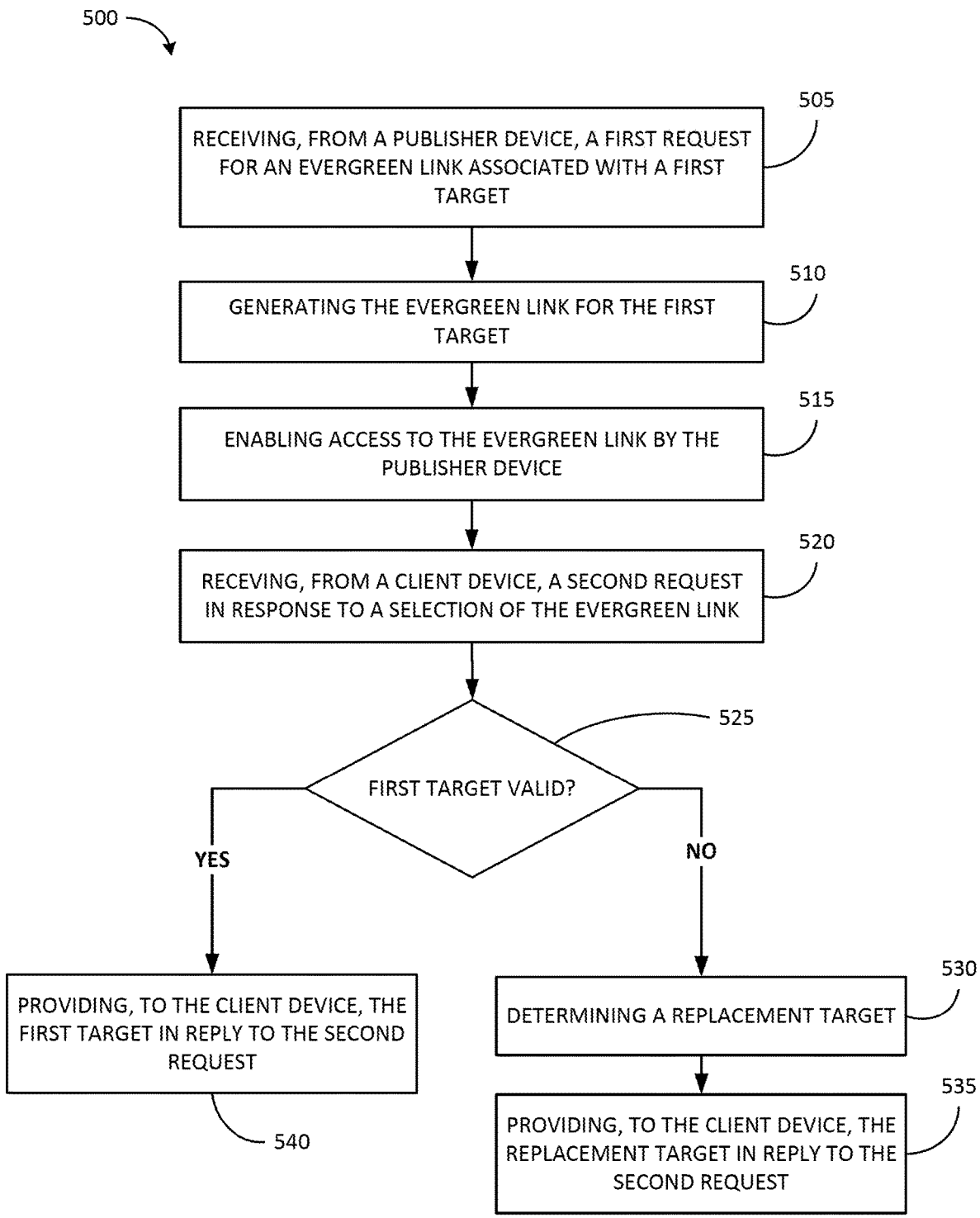
FIG. 5 is a flowchart illustrating a method for evergreen link generation and processing performed by the system of FIG. 1 in accordance with some embodiments.

FIG. 5 is a flowchart illustrating a method 500 for evergreen link generation and processing performed by the system 100 according to some embodiments. The method 500 is described as being performed by the server 105 and, in particular, the evergreen link application 220 as executed by the electronic processor 200. However, as noted above, some or all of the functionality described with respect to the method 500 may be performed by other devices, such as the publisher device 110, the client device 115, the vendor device 120, or a combination thereof, or distributed among a plurality of devices, such as a plurality of servers included in a cloud service.

As illustrated in FIG. 5, the method 500 includes receiving, from the publisher device 110 with the electronic processor 200, a first request for an evergreen link associated with a first target (at block 505). The publisher device 110 may generate and transmit the first request to the electronic processor 200 in response to a user interaction at the publisher device 110. As one example, the user interaction may include an affiliate selecting a target offering for inclusion on the affiliate's website. In some embodiments, the affiliate may browse a listing or catalog of offer data (using the SmartServe Widget illustrated in FIG. 4), including available target offerings and related target data (as described above), which may be managed by the server 105 (the offer curation and management software 230).

The electronic processor 200 then generates the evergreen link for the first target (at block 510). An evergreen link is a link, such as a uniform resource identifier ("URI") or a uniform resource locator ("URL"), that, when selected, directs a web browser to a target associated with the link. As noted above, a target (or a target offering) may be related to a product, good, or service offered for sale by a vendor (via a vendor website). The generated evergreen link may be a full link (for example, a URI that directs a web browser directly to the target) or a shortened version of the full link (for example, a URI that points a web browser to a resource to obtain the full link), as described in further detail below. In some embodiments, the evergreen link includes embedded within it vendor specific parameters to identify a publisher, such as a publisher identifier (uniquely identifying the publisher device 110) and website identifier (uniquely identifying a website hosted by or associated with the publisher device 110 and on which the evergreen link will be included). These vendor specific parameters allow a vendor (for example, the vendor device 120) to track the publisher of the evergreen link when the client device 115 ultimately uses the link. Accordingly, an evergreen link is associated with or linked to a target (or target offering) and a publisher.

After generating the evergreen link (at block 510), the electronic processor 200 enables access to the evergreen link by the publisher device 110 (at block 515). In some embodiments, the electronic processor 200 enables access to the evergreen link by transmitting or providing the evergreen link to the publisher device 110 over the communication network 130. Alternatively or in addition, the electronic processor 200 may store the evergreen link in the memory 205, a remote storage device or database, or a combination thereof. In such embodiments, the publisher device 110 may access the evergreen link by interacting with the memory 205, the remote storage device or database, or a combination thereof. In response to receiving the evergreen link, the publisher device 110 may publish the evergreen link on an affiliate website hosted by the publisher device 110 (or a publisher network including the publisher device 110). As one example, an affiliate may post or publish content including the evergreen link on the affiliate's website such that a consumer (via, for example, the client device 115) may access and interact with the evergreen link on the affiliate's website via a web browser of the client device 115.

As seen in FIG. 5, the method 500 also includes receiving a second request in response to a selection of the evergreen link (at block 520). In some embodiments, the electronic processor 200 receives the second request from the client device 115 over the communication network 130. The second request may be generated in response to a user of the client device 115 interacting with or selecting the evergreen link on an affiliate website. As one example, a web browser of the client device 115 may navigate to an affiliate website in response to input on the client device 115 by the user (or, consumer). While browsing the affiliate website, the web browser may interact with an evergreen link included on the affiliate's website (for example, the web browser may receive a selection of the evergreen link based on user input (for example, a mouse click) at the client device 115). Accordingly, in some embodiments, the evergreen link was received by the client device 115 from the publisher device 110. In response to this user interaction, the client device 115 (an electronic processor of the client device 115) may generate and transmit the second request.

In some embodiments, a link shortening service is implemented by the system 100. In such embodiments, the evergreen link produced in block 510 and selected by a user of the client device 115 in block 520 is a shortened evergreen link. A shortened evergreen link is a URI intended to be low in character count and, when accessed, instructs the client device 115 to request the original evergreen link URI. An HTML example of a shortened evergreen link may include the following:

<a href="https://okj.io/SHORT_CODE_ID">Check out this amazing product!</a>

As noted above, when a user selects a shortened evergreen link, the client device 115 is instructed to request the original evergreen link URI. Such a request may be, for example, the following HTTP request example:

GET/SHORTCODE_ID HTTP/1.1
Host: okj.io
Accept: */*
User-Agent: USER_AGENT
Referrer: PUBLISHER_PAGE_URI where the SHORTCODE_ID is a unique identifier of the shortened evergreen link, the USER-AGENT is a client user agent identifier, and the PUBLISHER_PAGE_URI is a source page URI which served as the shortened evergreen link. Accordingly, in such embodiments, the client device 115 requests the original evergreen link URI from the electronic processor 200 in response to a user selecting a shortened evergreen link.

In response to receiving this request, the electronic processor 200 provides a response including the original evergreen link URI. Such a response may be, for example, the following HTTP response example:

HTTP/1.1 302 Found
Date: Wed, 26 Feb. 2020 17:11:50 GMT
Content-Type: text/html; charset=utf-8
Content-Length: 0
Connection: keep-alive
Location: EVERGREEN_LINK_URI
Cache-Control: private, no-cache, proxy-revalidate, max-age=0
Vary: origin
Access-Control-Expose-Headers: WWW-Authenticate, Server-Authorization where the EVERGREEN_LINK_URI is a URI that will return a vendor offer link.

Accordingly, in some embodiments, the response instructs the client device 115 to request the given EVERGREEN_LINK_URI (for example, as the second request). A request for the EVERGREEN_LINK_URI may include, for example, the following HTTP request:

GET/EVERGREEN_LINK_URI HTTP/1.1
Host: farm.okanjo.com
Accept: */*
User-Agent: USER_AGENT
Referrer: PUBLISHER_PAGE_URI As one example, an EVERGREEN_LINK_URI may be:
https://farm.okanjo.com/api/INSTANCE_ID/links/OFFER_ID/follow?_okjo=CLICK_ID where the OFFER_ID is a unique identifier of the offer selected by the publisher (via the publisher device 110) and the CLICK_ID is a unique click identifier generated by the link shortening service.

In some embodiments, the electronic processor 200 determines whether to reject the second request. In such embodiments, the electronic processor 200 evaluates the second request to determine whether the second request is of malicious intent, not issued by a human actor, is fraudulent, illegitimate, or the like. In some embodiments, the electronic processor 200 determines whether to reject the second request based one or more considerations. Such considerations may include, for example, a client request header (for example, USER_AGENT, REFERRER, or the like), a source transmission control protocol ("TCP") or internet protocol ("IP") address, a time of day, a number of link accesses, and the like. As one example, when the electronic processor 200 receives ten-thousand second requests within a ten-minute period, the second requests are likely of malicious intent. The particular thresholds in terms of quantity of requests and time period for requests vary, in some embodiments. According to this example, the electronic processor 200 may identify the second requests as fraudulent and reject the second requests. In some embodiments, when the electronic processor 200 determines that the second request should be rejected, the method 500 ends.

In response to receiving the second request (at block 520), the electronic processor 200 determines whether the first target is valid (at block 525). In some embodiments, the electronic processor 200 determines whether the first target is valid by performing a look up of the target offering associated with the second request. In some embodiments, the electronic processor 200 may look up an identifier of the target offering (for example, the OFFER_ID) as referenced in the EVERGREEN_LINK_URI. As one example, the electronic processor 200 may look up the identifier (OFFER_ID) from the offer curation and management system 437 (for example, the identifier included in the offer data).

In some embodiments, the electronic processor 200 determines that the first target is valid (Yes at block 525) when the identifier (OFFER_ID) is found. As one example, an identifier of the first target may be found when the product associated with the first target is available for sale on a vendor website. However, in some embodiments, the electronic processor 200 determines that the first target is not valid (No at block 525) when the offer is not found. As one example, an identifier of the first target may not be found when the product associated with the first target is no longer available for sale on a vendor website (for example, is no longer being sold or is out of stock). Alternatively or in addition, in some embodiments, the electronic processor 200 may not find the identifier due to an invalid identifier, a target offering being removed by the publisher, or the like.

When the first target is not valid (No at block 525), the electronic processor 200 determines a replacement target (at block 530). When the offer is not found, the electronic processor 200 may use one or more attributes of the original offer to search for similar offers (for example, included in the offer data). As noted above, in some embodiments, the offer data is stored and managed by the offer curation and management software 230. Offer data may include a target (or target offering) and related target data. As noted above, a target may include a product, good, or service offered for sale on, for example, a vendor web site. Related target data may include, for example, a product category, a commission yield for an affiliate (for example, a percentage of sale, a flat rate, a cost per click or impression, and the like), a date (for example, a created data, an updated date, or the like), a description of the target (for example, target details, target features, and the like), an identifier (for example, a SKU, a UPC, an ISBN, an EAN, a GTIN, and the like), an image, a manufacturer, a maturity level (for example, adults, general audiences, children, or the like), a merchant or advertiser brand, a popularity (for example, reviewer ratings, number of purchases, and the like), a price (for example, a list price, a sale price, a subscription cost, a shipping cost, and the like), a title, a URL, a variation (for example, a size, a color, or the like), a vendor (for example, an affiliate network, an origin of the target, or the like), another parameter associated with the parameter, or a combination thereof.

Accordingly, in some embodiments, the electronic processor 200 compares the attributes of the original target offering to other target offerings included in the offer data. As one example, the original target offering is may include the following attributes: a commission yield of 0.01% commission per sale; Brand-A as the manufacturer; a maturity level of adults; a color of black; and a description of being a backpack. According to this example, the electronic processor 200 may search the offer data for other target offerings that share one or more attributes of the original target offering (as replacement targets or target offerings). The electronic processor 200 may select a replacement target based on the number of attributes shared with the original target. Accordingly, the replacement target may be a best match. Following the example above, the replacement target may be the best match when the replacement target shares all the same attributes as the original target (for example, a commission yield of 0.01% commission per sale; Brand-A as the manufacturer, a maturity level of adults, a color of black, and a description of being a backpack). The electronic processor 200 may select the replacement target based on a matching score (e.g., calculated based on a weighted algorithm that sums values resulting from comparing attributes of the original target and the potential replacement target), a relevance to the original target, a matching threshold, another selection parameter, or a combination thereof. As one example, the electronic processor 200 may select a target offering as a replacement target when that target offering shares at least five attributes (as a matching threshold) with the original target offering.

In some embodiments, when the offer is not found, the electronic processor 200 analyzes all or a subset of targets of the offer curation and management system 437 as potential replacement targets, providing a ranking or score for all or the subset of targets based on a comparison of attributes of the original target and of the potential replacement targets. For example, the electronic processor 200 conducts a search of the target offerings of the offer curation and management system 437 for replacement targets using a search query including the values for each or a subset of the attributes of the original target. These values may be previously stored in the memory system 437 and associated with the target. The search query may return a list of potential replacement targets, with each potential replacement target having a search score based on the number of matches between the attributes in the search query and the attributes of the criteria of the replacement targets. The higher the search score, the more relevance that the potential replacement target has to the original target that is unavailable. In some embodiments, the replacement target having the highest score is selected by the electronic processor 200 as the replacement target.

In some embodiments, one or more filters that limit or prioritize the replacement target selection may be provided by a curator of the server 105 or publisher (for example, associated with the publisher device 110) and stored in the system 437 (for example, at the point of requesting the evergreen link). For example, a filter may restrict replacement targets to a particular vendor or merchant, or may rank by a combination of search score and highest commission yield (for example, a replacement target with a high commission yield may be selected even though it has a lower search score than another potential replacement target). A graphical user interface provided by the publisher device 110 may enable a publisher to input the filter selections (for example, using a dropdown list, check list, modifiable ordered list, or other input). Accordingly, a publisher may customize the manner in which the electronic processor 200 identifies replacement targets in the event an original target is unavailable.

As noted above, the offer may not be found due to an invalid identifier, a removal of the offer by the publisher (causing the offer to be deleted from the system or to remain, but be tagged as invalid), or a combination thereof. In such embodiments, the replacement target may be a URI to another source configured by the affiliate (for example, https://okanjo.com). The electronic processor 200 may modify the selected offer URI path and parameters to include the proper attribution (or commission) for the affiliate. Alternatively or in addition, the electronic processor 200 may add parameters to the replacement target for analytics and reporting. An example VENDOR_OFFER_URI may be the following:

https://classic.avantlink.com/click.php?p=PUBLISHER_ID&pw=PUBLISHER_ID&pt=3&pri=PRODUCT_ID&tt=df&ctc=CLICK_ID where PUBLISHER_ID is an identifier of the publisher's account with the vendor, WEBSITE_ID is an identifier of the publisher's website with the vendor, PRODUCT_ID is an identifier of the product offer with the vendor, and CLICK_ID is an identifier generated by a link shortening service or the evergreen link service 300 for commission attribution.

After determining the replacement target (at block 530), the electronic processor 200 provides the replacement target to the client device 115 in reply to the second request (at block 535). Like the original evergreen link, the replacement target may be a URI and may have embedded within it the same vendor parameters enabling the vendor device 120 to still track the publisher of the evergreen link, even though the target has changed. In some embodiments, the electronic processor 200 provides the replacement target to the client device 115 via the communication network 130. As one example, the electronic processor 200 may generate and transmit the following example HTTP response to the client device 115:

HTTP/1.1 302 Found
    Date: Wed, 26 Feb. 2020 17:36:10 GMT
    Content-Type: text/html; charset=utf-8
    Content-Length: 0
    Connection: keep-alive
    Location: VENDOR_OFFER_URI
    Cache-Control: private, no-cache, proxy-revalidate, max-age=0
    Vary: origin
    Access-Control-Expose-Headers: WWW-Authenticate, Server-Authorization where the VENDOR_OFFER_URI is the vendor offer link URI that the client device 115 will visit.

When the first target is valid (Yes at block 525), the electronic processor 200 provides the first target to the client device 115 in reply to the second request (at block 540). As noted above, the electronic processor 200 determines that the first target is valid (Yes at block 525) when the first target is found (for example, when the first target is an available target offering or when a product associated with the first target is available for sale on a vendor website). Accordingly, when the first target is found (is valid), the electronic processor 200 may provide the first target to the client device 115 via the communication network 130, where the first target may include the vendor offer link URI (for example, VENDOR_OFFER_URI) associated with the first target.

In response to receiving the VENDOR_OFFER_URI (for example, either the first target or the replacement target), the client device 115 will generate and transmit a request for the VENDOR_OFFER_URI. An example HTTP request for the VENDOR_OFFER_URI may be the following:

GET/VENDOR_OFFER_URI HTTP/1.1
    Host: [hostname extracted from VENDOR_OFFER_URI]
    Accept: */*
    User-Agent: USER_AGENT
    Referrer: PUBLISHER_PAGE_URI where VENDOR_OFFER_URI is the final offer URI that the client device 115 will visit (for example, with a web browser), USER_AGENT is a client user agent identifier, and PUBLISHER_PAGE_URI is a source page URI which served as a shortened evergreen link.

In response to receiving the request for the VENDOR_OFFER_URI from the client device 115, the vendor device 120 will issue a response to the client device 115. In some embodiments, the URI may point to another link tracking system (managed by a vendor) before ultimately returning the URI of the target offering. However, in other embodiments, the response generated and provided to the client device 115 by the vendor device 120 may be the final target offer URI.

As previously described, whether the original target or replacement target is received by the client device 115, the client device 115 is directed to the target received. For example, returning to the kayak example, the client device 115 may be directed to a particular kayak offering at the kayak vendor's website. The consumer, via the client device 115, may ultimately purchase the kayak using the kayak vendor's website. The vendor device 120 may also determine from which publisher device 120 or website the client device 115 came based on information provided in the link (e.g., a unique identifier of the publisher device 120 or website). The vendor device 120, in turn, may save this information and information about purchases that result from the visit at the kayak vendor's web site (for example, a number of purchase, cost of the purchase, item purchased, and the like), and ultimately provide compensation to the publisher when the consumer purchases an offering provided by the kayak vendor. Additionally, while aspects of the evergreen link may be described herein with respect to an example including web browser on the client device accessing an evergreen link and target offering on a vendor website, these aspects similarly apply to a dedicated software application that is executing on the client device 115 and that is in communication with the vendor device 120 (for example, to enabling browsing, reviewing, and purchasing of offerings by the associated vendor).

Thus, the embodiments provide, among other things, methods and systems for evergreen link generation and processing. Various features and advantages of certain embodiments are set forth in the following claims.

What is claimed is:

1. A system for evergreen link generation and processing, the system comprising:
    a communication interface;
    a memory;
    and an electronic processor coupled to the communication interface and the memory, the electronic processor configured to
        receive, from a publisher device via the communication interface, a first request for an evergreen link associated with a first target,
        generate the evergreen link for the first target,
        enable access to the evergreen link by the publisher device,
        receive, from a client device via the communication interface, a second request in response to a selection of the evergreen link, wherein the evergreen link was received by the client device from the publisher device,
        determine whether the first target is valid,
        when the first target is not valid,
            determine a replacement target, and
            provide, to the client device, the replacement target in reply to the second request, and
        when the first target is valid,
            provide, to the client device, the first target in reply to the second request.

2. The system of claim 1, wherein the electronic processor is configured to enable access to the evergreen link by the publisher device by transmitting the evergreen link to the publisher device via the communication interface.

3. The system of claim 1, wherein the evergreen link is a uniform resource identifier.

4. The system of claim 1, wherein the electronic processor is configured to determine whether the first target is valid by determining an identifier of the first target and searching offer data for the identifier of the first target.

5. The system of claim 4, wherein the electronic processor determines that the first target is valid when the offer data includes the identifier of the first target.

6. The system of claim 4, wherein the electronic processor determines that the first target is not valid when the offer data does not include the identifier of the first target.

7. The system of claim 1, wherein the electronic processor is configured to identify a first set of attributes associated with the first target.

8. The system of claim 7, wherein the set of attributes includes at least one selected from a group consisting of a commission yield, an identifier, a manufacturer, a maturity level, a popularity, and a price.

9. The system of claim 7, wherein the set of attributes includes at least one selected from a group consisting of a date, a description, a merchant or brand, a title, a variation, and a vendor.

10. The system of claim 7, wherein the electronic processor is configured to determine the replacement target based on the plurality of attributes associated with the first target and a set of attributes of the replacement target.

11. The system of claim 1, wherein the replacement target shares at least one attribute with the first target.

12. A method for evergreen link generation and processing, the method comprising:
receiving, from a publisher device with an electronic processor, a first request for an evergreen link associated with a first target;
generating, with the electronic processor, the evergreen link for the first target;
enabling, with the electronic processor, access to the evergreen link by the publisher device;
receiving, from a client device with the electronic processor, a second request in response to a selection of the evergreen link, wherein the evergreen link was received by the client device from the publisher device,
determining, with the electronic processor, whether the first target is valid;
when the first target is not valid,
determining, with the electronic processor, a replacement target, and
providing, to the client device with the electronic processor, the replacement target in reply to the second request; and
when the first target is valid,
providing, to the client device with the electronic processor, the first target in reply to the second request.

13. The method of claim 12, further comprising:
before determining whether the first target is valid, determining whether to reject the second request.

14. The method of claim 13, wherein determining whether to reject the second request includes determining whether the second request based on a set of considerations, wherein the set of considerations includes at least one selected from a group consisting of a client request header, a source transmission control protocol address, an internet protocol address, a time of day, and a number of link accesses.

15. The method of claim 13, wherein determining whether to reject the second request includes determining to reject the second request in response to determining that the second request is illegitimate.

16. The method of claim 12, wherein determining whether the first target is valid includes
determining an identifier of the first target; and
searching offer data for the identifier of the first target.

17. The method of claim 16, wherein determining whether the first target is valid includes determining that the first target is valid when the offer data includes the identifier of the first target.

18. A non-transitory, computer-readable medium storing instructions that, when executed by an electronic processor, perform a set of functions, the set of functions comprising:
receiving, from a publisher device, a first request for an evergreen link associated with a first target;
generating the evergreen link for the first target;
enabling access to the evergreen link by the publisher device;
receiving, from a client device, a second request in response to a selection of the evergreen link, wherein the evergreen link was received by the client device from the publisher device;
determining whether the first target is valid;
when the first target is not valid,
determining a replacement target, and
providing, to the client device, the replacement target in reply to the second request; and
when the first target is valid,
providing, to the client device, the first target in reply to the second request.

19. The computer-readable medium of claim 18, wherein determining the replacement target includes determining the replacement target based on a set of attributes of the first target.

20. The computer-readable medium of claim 18, wherein determining the replacement target includes identifying a potential replacement target as a best match for the first target, wherein the potential replacement target is identified as the best match for the first target using at least one selected from a group consisting of a matching score, a relevance with the first target, and a matching threshold.

* * * * *